March 9, 1948. V. ZAMORA 2,437,584
BALLOT BOX
Filed May 26, 1947 2 Sheets-Sheet 1

Inventor
Vicente Zamora

March 9, 1948.  V. ZAMORA  2,437,584
BALLOT BOX
Filed May 26, 1947  2 Sheets-Sheet 2

Inventor
Vicente Zamora

By Clarence A. O'Brien
and Harvey B. Jacobson
Attorneys

Patented Mar. 9, 1948

2,437,584

UNITED STATES PATENT OFFICE 2,437,584

BALLOT BOX

Vicente Zamora, Manila, P. I.

Application May 26, 1947, Serial No. 750,423

2 Claims. (Cl. 232—2)

My invention relates to improvements in ballot boxes, the primary object in view being to provide a simply constructed, inexpensive box for ballots and embodying means for preventing destruction, or mutilation, of ballots therein by the pouring of acids, or other liquids, into the box.

Another object is to provide in a device of the character and for the purpose above set forth, means for preventing unauthorized removal of ballots from the box through the opening for depositing ballots in said box.

To the accomplishment of the above, and subordinate objects presently appearing, a preferred embodiment of my invention has been illustrated in the accompanying drawings, set forth in detail in the succeeding description, and defined in the claims appended hereto.

Figure 1:
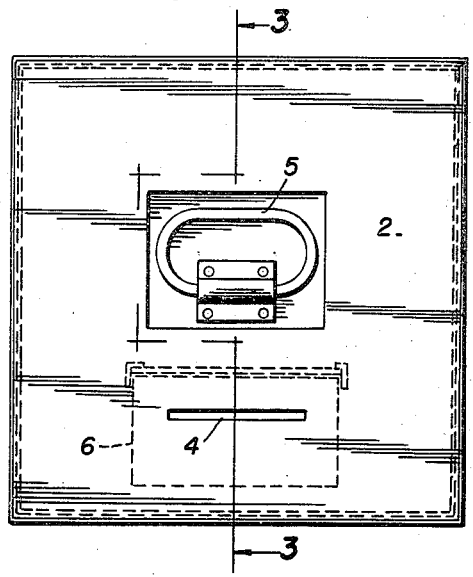
Figure 1 is a view in plan of my improved ballot box in the preferred embodiment thereof.
Figure 2:
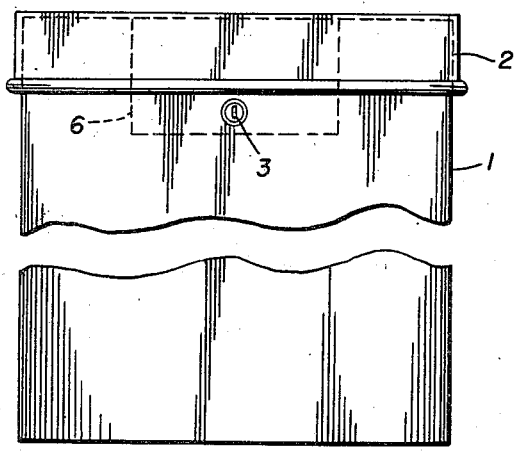
Figure 2 is a view in front elevation, partly broken away.
Figure 3:
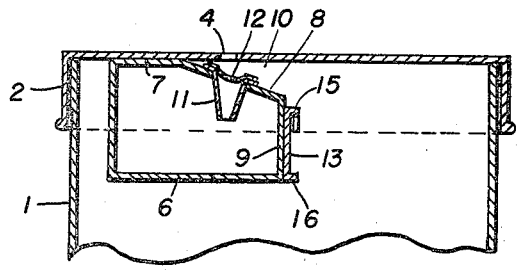
Figure 3 is a fragmentary view in transverse section taken on the line 3—3 of Figure 1.

Referring now to the drawings by numerals, according to my invention, as illustrated, a rectangular box 1, of any suitable acid and waterproof material, is provided with a flanged cover 2 fitting down over the top of the box 1 and which may be secured in place by any suitable form of lock such as indicated at 3 and preferably provided on the front side of the box. A slot 4 in the cover 2, preferably adjacent to and parallel with the front side of the box 1, provides for insertion of ballots, not shown, into the said box.

A suitable handle 5 is provided on the cover 2 in the center thereof for removing said cover 2 and replacing the same.

A relatively smaller, liquid trap 6 of box-like form and acid and leak-proof material is suspended from the cover 2 beneath the slot 4 to depend into the top of the slot 4 for a distance suitable for a purpose presently seen.

The trap 6 is, with the exception presently noted, completely closed with sides arranged parallel to the sides of the cover 2 and box 1 and spaced therefrom. The top of the trap 6 is of obtuse angled cross sections transversely of the slot 4 to provide a flat portion 7 of said top and a relatively larger oblique portion 8 inclining downwardly from the portion 7 to a reduced side 9 of said trap. The flat portion 7 is secured, in any suitable manner, flat against the top of the cover 2 at one side of the slot 4 so that the oblique portion 8 inclined downwardly from the cover 2 below the slot 4 transversely thereof and beyond the other side of said slot to said reduced side 9 of the trap, and whereby said reduced portion 8 forms with the top of the cover 2 a horizontally disposed throat 10 between the top of the cover 2 and said trap 6 flaring cross-wise of the slot 4 to a point well beyond one side of the same and into which said slot 4 opens.

A spout member 11, longer than the slot 4 and downwardly tapering in cross section, is inserted through the oblique portion 8 of the trap 6 to extend into said trap in vertical alignment and parallel with the slot 4, said spout member 11 fitting substantially flush against said portion 8 and being covered by a screen member 12 of reticulated material.

A vertically slidable panel 13 is loosely confined against the reduced side 9 of the trap 6 in guide lugs 14 on said side, said panel 13 having top and bottom reinforcing flanges 15, 16, the top one of which, when the box is upright, resting upon and suspending said panel 13 from the guide lugs 14 below the mouth of the throat 10.

Figure 4:
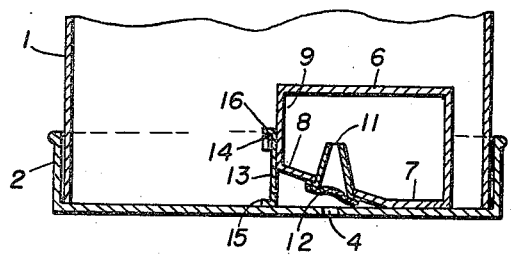
Figure 4 is a similar view with the box inverted.
Figure 5:
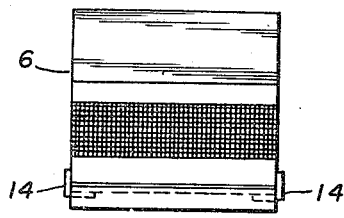
Figure 5 is a view in plan of the trap detached.
Figure 6:
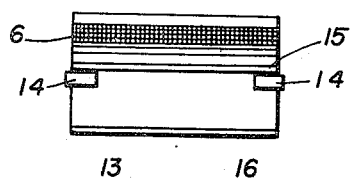
Figure 6 is a view in side elevation of the same.

In using the described ballot box, when the ballots are inserted through the slot 4, the same enter the throat 10 and are deflected by the screen member 12 and oblique portion 8 of the top of the trap 6 to the deep end of said throat 10 to fall out of said throat into the box 1. Attempts to ruin the ballots in the box 1 by pouring acid, or other liquid, into the slot 4 are frustrated by virtue of the fact that such acid, or other liquid, will pass through the screen member 12 and spout member 11 into the trap 6 and thus be isolated from the box 1. Attempts to extract ballots from the box 1 by way of the slot 4, by inverting the box 1, as shown in Figure 4, and fishing for the ballots through said slot 4 and throat 10 will be frustrated by virtue of the fact that when said box 1 is thus inverted, the vertically slidable panel 13 will drop down, under the influence of gravity, and close the deeper end of the throat 10 so that ballots can not be pulled into the throat and out of the slot 4, all as shown in Figure 4. Attempts to dump acid, or other liquid, contained in the trap 6 into the box 1 by way of the throat 10 and by inverting the box 1 will be blocked since, unless the trap 6 is full, contents issuing out of the spout 11 will pass out of the slot 4 before it can harm ballots in the box 1. Obviously, by unlocking the cover 2 and removing the same, together with the trap 6, access may be had to the box 1 for removal of ballots by authorized persons.

The foregoing will, it is believed, suffice to embody a clear understanding of my invention, without further explanation.

Manifestly, the invention, as described, is susceptible of modifications, without departing from the inventive concept, and rights herein reserved to such modifications as fall within the scope of the appended claims.

Having described the invention, what is claimed as new is:

1. A device of the class described comprising a box for receiving ballots therein, a cover for closing said box provided with a slot in the top thereof for the insertion of ballots therethrough into said box, a closed box-like member depending from said cover beneath said slot and having an oblique top portion forming with the top of the cover a horizontal throat extending transversely beneath said slot and flaring away from the same whereby ballots inserted in the slot are deflected to one side of the slot to drop into the box, said member blocking direct access to the box by way of said slot to prevent ballots from being fished out of said box through the slot, said member having a top opening therein extending parallel with said slot in vertical alignment therewith whereby liquid poured through said slot to ruin the ballots will descend into said member and be trapped therein, and a screen covering said opening to block entrance of ballots into said member.

2. A device of the class described comprising a box for receiving ballots therein, a cover for closing said box provided with a slot in the top thereof for the insertion of ballots therethrough into said box, a member on the top of said cover beneath said slot having an oblique portion forming with the top of the cover a horizontal throat extending transversely beneath said slot and flaring away from the same whereby ballots inserted in the slot are deflected to one side of the slot to drop into the box, and a slide panel on said member slidable under the influence of gravity when the box is inverted across said throat to block attempts to pull ballots out of the box through said throat and slot when the box is inverted.

VICENTE ZAMORA.